United States Patent Office 3,205,173
Patented Sept. 7, 1965

3,205,173
SYNTHETIC LUBRICATING OILS COMPRISING DEHYDROCONDENSATION PRODUCTS OF MONO-ESTERS
Herbert L. Hepplewhite and Edward A. Oberright, Woodbury, and Albert L. Williams, Pitman, N.J., assignors to Socony Mobil Oil Company, Inc., a corporation of New York
No Drawing. Filed Jan. 2, 1962, Ser. No. 163,907
7 Claims. (Cl. 252—56)

This invention relates to the art of lubrication. More particularly, it is concerned with synthetic type lubricating oils comprising dehydrocondensates of certain mono-esters.

As is well known, mono-esters are generally unsatisfactory as engine lubricating oils due to their high volatilities, low viscosities and/or high pour points. In accordance with the present invention, however, it has been found that when such esters are subjected to dehydrocondensation in the presence of an organic peroxide, such as di-tertiary butyl peroxide, they are converted to products having viscosity and volatility characteristics which make them highly suitable as engine lubricating oils per se, or as thickeners and viscosity index improving components for conventional ester lubricating oils. Accordingly, it is a primary object of this invention to provide a novel class of synthetic lubricating oils comprising dehydrocondensates of mono-esters.

It is also an object to provide novel lubricating oil compositions comprising blends of conventional ester oils and containing dehydrocondensed mono-esters.

Further objects and advantages of the invention will appear from the following detailed description thereof.

The mono-esters which are dehydrocondensed in accordance with the invention are those derived from aliphatic monocarboxylic acids having from one to about 18 carbon atoms, exclusive of the carboxyl group carbon and aliphatic monohydroxy alcohols of from one to about 18 carbon atoms. The esters suitable for the invention are characterized by the presence therein of at least one alkyl radical of about 8 or more carbon atoms, which radical may be derived from either the acid or alcohol used in forming the ester. Thus, mono-esters suitable in the invention will conform to the general formula:

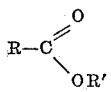

where R and R' represent alkyl radicals of from one to 18 carbon atoms, at least one of said radicals containing at least about 8 carbon atoms. Non-limiting examples of such mono-esters are the following:

Octyl acetate
Decyl acetate
Octadecyl acetate
Methyl decanoate
Methyl myristate
Butyl stearate
Methyl oleate
Octadecyl stearate The organic peroxide used in the reaction may be any organic peroxide which breaks down on heating to give free radicals. However, tertiary alkyl peroxides containing from 8 to about 20 carbon atoms, such as di-t-butyl peroxide, di-t-amyl peroxide, t-amyl, t-butyl peroxide and di-t-octyl peroxide, have been found to be particularly suitable.

Without intending to limit the invention in any way by theory, it is believed that the reaction between the mono-ester and the peroxide is principally that shown by the empirical equation:

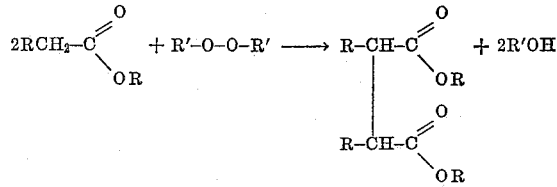

where R and R' represent alkyl and tertiary alkyl radicals, respectively. However, the molecular weights of the products obtained indicate that some higher condensates are also produced in the reaction. The products are, therefore, apparently mixed condensates, the precise composition of which is not known. It has been found that employment of a relatively small amount of the peroxide, i.e. about ⅙ mol per mol of the mono-ester, will provide products of substantially increased viscosity (over that of the mono-ester). Also, the viscosity of the product increases as the amount of peroxide used in the reaction is increased up to a ratio of about 2 mols of the peroxide per mol of the mono-ester. The latter, therefore, represents the practical upper limit of the amount of peroxide to be employed in the reaction.

The reaction is conducted by simply intermixing the peroxide and a mono-ester and heating the mixture at a temperature of from about 100° C. to about 200° C. for a period of from about one to about 10 hours. Free alcohol formed in the reaction and unreacted ester are removed from the product by distillation. It will be understood that the reaction may be conducted in stages by initially reacting a relatively small amount, such as ⅙ of a mol per mol of the mono-ester, followed by reaction of additional small amounts until the viscosity of the product reaches the desired level, or all of the peroxide required may be reacted at one time. The former procedure is useful in determining the amount of peroxide which will provide a product of a certain viscosity from a particular mono-ester, while the latter procedure is generally the one used after such a determination has been made.

A full understanding of the invention will be had by reference to the following specific examples.

EXAMPLE 1. —DEHYDROCONDENSATION OF METHYL MYRISTATE

A mixture of 485 grams (2 mols) of methyl myristate and 50 grams (⅓ mol) of di-t-butyl peroxide were reacted under reflux at 140–150° C. for 7 hours. Tertiary butyl alcohol, formed during the reaction, was removed by distillation. A 100 ml. sample (83.8 grams) was taken from the reaction mixture and unreacted methyl myristate removed therefrom by distillation at reduced pressure (1.00 mm. Hg). The bottoms amounted to 19.8 grams or a 24% yield of product, based on the mono-ester.

The reaction mixture was then subjected to reaction with 6 additional portions of di-t-butyl peroxide in the same manner as the initial reaction. The portions thus added in each instance amounted to about 10% by weight, of the reaction mixture. Samples were taken from the reaction mixture after the second, fourth and seventh reactions. Unreacted methyl myristate was removed from the sample in each instance. Table I shows the yields obtained and some physical properties of the products as compared to methyl myristate. It will be noted from the table that while methyl myristate has too high a pour point and too low a viscosity at 210° F. to serve as an engine lubricating oil, the products have higher viscosities and lower pour points which bring them within the lubricating oil range.

Blending characteristics of the product from the 7th peroxide reaction in a typical ester oil, di-2-ethylhexyl sebacate, are given in Table IA. It will be seen that the product raised the viscosity of the ester oil substantially without significantly changing its viscosity index.

Table I.—Properties of products from dehydrocondensation of methyl myristate

|  | Yield, percent | $KV_{100}$ | $KV_{210}$ | Pour point, °F. |
|---|---|---|---|---|
| Methyl Myristate |  | 3.42 | 1.35 | +65 |
| Product from 1st Reaction | 24 | 40.40 | 6.67 | −5 |
| Product from 2nd Reaction | 37 | 63.02 | 8.99 | −10 |
| Product from 4th Reaction | 55 | 180.3 | 18.45 |  |
| Product from 7th Reaction | 73 | 1,518 | 86.60 |  |

Table IA.—Effect of dehydrocondensate of methyl myristate on viscosity-temperature properties of di-2-ethylhexyl sebacate

|  | $KV_{100}$ | $KV_{210}$ | VI |
|---|---|---|---|
| (1) Di-2-Ethylhexyl Sebacate | 12.55 | 3.31 | 154 |
| (1) +25%ª Dehydrocondensate of Methyl Myristate | 30.86 | 6.37 | 154 |
| (1) +50%ª Dehydrocondensate of Methyl Myristate | 89.05 | 13.32 |  |

ª Based on the total composition.

EXAMPLE 2.—DEHYDROCONDENSATION OF DECYL ACETATE

A mixture of 450 grams (2.25 mols) of decyl acetate and 54.8 grams (0.375 mol, about 10%, by weight) of di-t-butyl peroxide was reacted under reflux at 135–140° C. for 7 hours. Tertiary-butyl alcohol, formed during the reaction, was removed by distillation. A sample weighing 238.9 grams was removed and unreacted decyl acetate was taken off by distillation at reduced pressure. The yield of product in this instance amounted to 21% based on the mono-ester.

Here again as in Example 1, the reaction mixture was subjected to 6 additional reactions with the peroxide under the conditions of the initial reaction. In each instance the portion of peroxide added amounted to about 10%, by weight, of the reaction mixture. Samples were taken from the first and seventh reactions and unreacted decyl acetate removed therefrom by distillation. Yield data and some physical properties of the products are given in Table II. Here again, it is seen that the decyl acetate which has a very low viscosity and a relatively high pour point is converted to products of high viscosity and low pour points characteristic of desirable engine lubricating oils. Thus, jet engine oils, for example, must have viscosities of at least about 3 cs. at 210° F. and pour points of −35° F. or lower, while motor oils have viscosities of about 4 cs. at 210° F. and higher. In general, the products contemplated will range from about 3 to about 500 cs. at 210° F., the products in the lower viscosity range, i.e., from about 3 cs. to about 100 cs. being useful as lubricants per se, while those of higher viscosities, i.e., from about 100 cs. to about 500 cs., are useful as thickening agents for lubricating oil compositions, including greases.

Blending characteristics of the product from the seventh reaction in di-2-ethylhexyl sebacate oil are given in Table IIA. The increase in viscosity and viscosity index with addition of this product to the base ester oil is evident.

Table II.—Properties of products from dehydrocondensation of decyl acetate

|  | Yield, percent | Mol. Wt. | $KV_{100}$ | $KV_{210}$ | Pour point, °F. |
|---|---|---|---|---|---|
| Decyl Acetate |  | 200 | 2.11 | 0.39 | +5 |
| Product from 1st Reaction | 21 | 480 | 19.25 | 4.01 | −35 |
| Product from 7th Reaction | 70 | 2,250 |  | 378.6 |  |

Table IIA.—Effect of dehydrocondensate of decyl acetate on viscosity-temperature properties of di-2-ethylhexyl sebacate

|  | $KV_{100}$ | $KV_{210}$ | VI |
|---|---|---|---|
| (1) Di-2-Ethylhexyl Sebacate | 12.55 | 3.31 | 154 |
| (1) +5%ª Dehydrocondensote of Decyl Acetate | 15.76 | 3.94 | 171 |
| (1) +10%ª Dehydrocondensate of Decyl Acetate | 19.41 | 4.69 | 175 |
| (1) +30%ª Dehydrocondensate of Decyl Acetate | 35.66 | 7.59 |  |

ª Based on the total composition.

Results similar to those shown in Tables IA and IIA are attained with blends of the products in conventional ester oils other than di-2-ethylhexyl sebacate. As is well known, these ester oils are derived from either (a) monohydric aliphatic alcohols, such as butyl, iso-butyl, octyl, decyl, dodecyl and tetradecyl alcohol, and aliphatic dicarboxylic acids, such as adipic, pimelic, suberic, azelaic and sebacic acid, or (b) polyhydric alcohols, such as ethylene glycol, trimethylol propane, trimethylol butane, pentaerythritol, etc., and monocarboxylic acids, such as acetic, valeric, decanoic, myristic, stearic, etc.

It will be understood that the amount of the dehydrocondensation product added to the ester oil can vary over a wide range, depending upon the viscosity of the particular product used and the viscosity desired in the finished blend. Thus, the products, being lubricating oils of themselves, may comprise either a major or a minor proportion of the finished oil blend. From the standpoint of increasing the viscosity and/or viscosity index of the ester-base oil, however, the amount of dehydrocondensation product employed will generally be no greater than about 40 weight percent and may be as little as 1 weight percent, based on the total composition.

In summary, it is manifest that the present invention provides (1) a novel class of synthetic lubricating oils comprising dehydrocondensation products of mono-esters and (2) novel oil compositions comprising conventional ester oils blended with dehydrocondensation products of mono-esters.

It will be understood that the oil compositions of the invention may contain one or more additives normally used to improve the various properties thereof such as detergents, antioxidants, rust inhibitors, anti-foam agents, etc.

Although the invention has been illustrated herein by means of specific examples and embodiments thereof, it is not intended that the invention be limited in any way thereby but only as illustrated in the following claims.

What is claimed is:

1. A lubricating oil consisting essentially of a dehydrocondensation product having a kinematic viscosity in the range of about 3 to 500 cs. at 210° F. prepared by reacting one mol proportion of a mono-ester of the formula

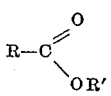

where R and R' represent alkyl radicals of from one to about 18 carbon atoms, at least one of said radicals containing at least about 8 carbon atoms, with from about ⅙ to about 2 mol proportions of a di-tertiary-alkyl peroxide containing from about 8 to about 20 carbon atoms, at a temperature of from about 100° C. to about 200° C., to form a dehydrocondensation product of said ester and removing free alcohol formed in the reaction and unreacted ester from the dehydrocondensation product.

2. A lubricating oil consisting essentially of a dehydrocondensation product having a kinematic viscosity in the range of about 3 to 500 cs. at 210° F. prepared by reacting one mol proportion of methyl myristate with from about ⅙ to about 2 mol proportions of di-tertiary-butyl peroxide, at a temperature of from about 100° C. to about 200° C., to form a dehydrocondensation product of methyl myristate and removing free di-tertiary-butyl alcohol formed in the reaction and unreacted methyl myristate from the dehydrocondensation product.

3. A lubricating oil consisting essentially of a dehydrocondensation product having a kinematic viscosity in the range of about 3 to 500 cs. at 210° F. prepared by reacting one mol proportion of decyl acetate with from about ⅙ to about 2 mol proportions of di-tertiary-butyl peroxide, at a temperature of from about 100° C. to about 200° C., to form a dehydrocondensation product of decyl acetate and removing free di-tertiary-butyl alcohol formed in the reaction and unreacted decyl acetate from the dehydrocondensation product.

4. A lubricating oil composition consisting essentially of a blend of a conventional ester oil and a dehydrocondensation product prepared by reacting one mol proportion of a mono-ester of the formula

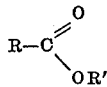

where R and R' represent alkyl radicals of from one to about 18 carbon atoms, at least one of said radicals containing at least about 8 carbon atoms, with from about ⅙ to about 2 mol proportions of a di-tertiary-alkyl peroxide containing from about 8 to about 20 carbon atoms, at a temperature of from about 100° C. to about 200° C., to form a dehydrocondensation product of said ester and removing free alcohol formed in the reaction and unreacted ester from the dehydrocondensation product said blend having a kinematic viscosity in the range of 3 to 500 cs. at 210° F.

5. A lubricating oil composition consisting essentially of a blend of di-2-ethylhexyl sebacate and a dehydrocondensation product prepared by reacting one mol proportion of a mono-ester of the formula

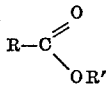

where R and R' represent alkyl radicals of from one to about 18 carbon atoms, at least one of said radicals containing at least about 8 carbon atoms, with from about ⅙ to about 2 mol proportions of a di-tertiary-alkyl peroxide containing from about 8 to about 20 carbon atoms, at a temperature of from about 100° C. to about 200° C., to form a dehydrocondensation product of asid ester and removing free alcohol formed in the reaction and unreacted ester from the dehydrocondensation product said blend having a kinematic viscosity in the range of 3 to 500 cs. at 210° F.

6. A lubricating oil composition consisting essentially of a blend of di-2-ethylhexyl sebacate and from about 1% to about 50%, by weight based on the total composition, of a dehydrocondensation product prepared by reacting one mol proportion of methyl myristate with from about ⅙ to about 2 mol proportions of di-tertiary-butyl peroxide, at a temperature of from about 100° C. to about 200° C., to form a dehydrocondensation product of methyl myristate and removing free di-tertiary-butyl alcohol formed in the reaction and unreacted methyl myristate from the dehydrocondensation product said blend having a kinematic viscosity in the range of 3 to 500 cs. at 210° F.

7. A lubricating oil composition consisting essentially of di-2-ethylhexyl sebacate and from about 1% to about 50%, by weight, based on the total composition, of a dehydrocondensation product prepared by reacting one mol proportion of decyl acetate with from about ⅙ to about 2 mol proportions of di-tertiary-butyl peroxide, at a temperature of from about 100° C. to about 200° C., to form a dehydrocondensation product of decyl acetate and removing free di-tertiary-butyl alcohol formed in the reaction and unreacted decyl acetate from the dehydrocondensation product said blend having a kinematic viscosity in the range of 3 to 500 cs. at 210° F.

References Cited by the Examiner

UNITED STATES PATENTS

| | | | |
|---|---|---|---|
| 2,429,219 | 10/47 | Cowan | 260—407 X |
| 2,801,263 | 7/57 | Hasek et al. | 260—485 |
| 2,808,418 | 10/57 | Harrison | 260—404.8 |
| 2,820,014 | 1/58 | Hartley et al. | 252—56 |
| 2,839,571 | 6/58 | Johnston et al. | 260—485 |
| 2,961,406 | 11/60 | McNeil et al. | 252—56 |
| 2,993,860 | 7/61 | Critchley | 252—57 |

FOREIGN PATENTS 591,543   8/47   Great Britain.

DANIEL E. WYMAN, *Primary Examiner.*

JULIUS GREENWALD, *Examiner.*